United States Patent
Mori et al.

(10) Patent No.: US 12,519,491 B2
(45) Date of Patent: Jan. 6, 2026

(54) RADIO-FREQUENCY CIRCUIT AND COMMUNICATION APPARATUS

(71) Applicant: Murata Manufacturing Co., Ltd., Nagaokakyo (JP)

(72) Inventors: Hirotsugu Mori, Nagaokakyo (JP); Hidenori Obiya, Nagaokakyo (JP); Morio Takeuchi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 251 days.

(21) Appl. No.: 18/193,639

(22) Filed: Mar. 31, 2023

(65) Prior Publication Data
US 2023/0238987 A1 Jul. 27, 2023

Related U.S. Application Data

(63) Continuation of application No. PCT/JP2021/036604, filed on Oct. 4, 2021.

(30) Foreign Application Priority Data

Oct. 9, 2020 (JP) .................................. 2020-171345

(51) Int. Cl.
*H04B 1/00* (2006.01)
*H04B 1/04* (2006.01)

(52) U.S. Cl.
CPC .......... *H04B 1/0078* (2013.01); *H04B 1/0483* (2013.01); *H04B 2001/0491* (2013.01)

(58) Field of Classification Search
CPC .................. H04B 1/006; H04B 1/0057; H04B 2001/0408; H04B 1/04; H04B 1/525;
(Continued)

(56) References Cited

U.S. PATENT DOCUMENTS 10,284,244 B1 5/2019 Kulkarni et al.
12,176,932 B2 * 12/2024 Wloczysiak ......... H04B 1/0057
(Continued)

FOREIGN PATENT DOCUMENTS

EP 2651039 A1 10/2013
JP 5-46126 U 6/1993
(Continued)

OTHER PUBLICATIONS

International Search Report and Written Opinion mailed on Dec. 14, 2021, received for PCT Application PCT/JP2021/036604, filed on Oct. 4, 2021, 11 pages including English Translation.
(Continued)

*Primary Examiner* — Golam Sorowar
(74) *Attorney, Agent, or Firm* — XSENSUS LLP

(57) ABSTRACT

A radio-frequency circuit includes a first filter having a first passband including a first band; a second filter having a second passband including the first band; a power amplifier that amplifies a radio-frequency signal in the first band; and a switch that switches between connection between the first filter and the power amplifier and a connection between the second filter and the power amplifier. Under a condition that a transmission of the radio-frequency signal in the first band is not V2X communication, the first filter is connected to the power amplifier via the switch. Under a condition that the transmission of the radio-frequency signal in the first band is the V2X communication, the second filter is connected to the power amplifier via the switch.

20 Claims, 5 Drawing Sheets

(58) Field of Classification Search
CPC .......... H04B 1/18; H04B 1/40; H04B 1/0458;
H04B 1/44; H04B 1/0064; H04B 1/0475;
H04B 1/0483; H04B 1/48; H04B 1/0067;
H04B 1/50; H04B 1/10; H04B 1/0078;
H04B 2001/0416; H04B 1/1615; H04B
1/00; H04B 1/1036; H04B 1/401; H04B
1/005; H04B 1/38; H04B 1/0053; H04B
1/16; H04B 1/52; H04B 1/1018; H04B
1/12; H04B 2001/1063; H04B 2001/485;
H04B 1/109; H04B 1/1638
See application file for complete search history.

(56) References Cited

U.S. PATENT DOCUMENTS

| | | |
|---|---|---|
| 2014/0177686 A1 | 6/2014 | Greene et al. |
| 2016/0006556 A1* | 1/2016 | Pehlke ................ H04B 1/0057 370/280 |
| 2016/0127015 A1 | 5/2016 | Wloczysiak et al. |
| 2017/0207534 A1 | 7/2017 | Zhang |
| 2018/0261566 A1 | 9/2018 | Babcock et al. |
| 2019/0334573 A1 | 10/2019 | Thompson et al. |
| 2020/0014429 A1 | 1/2020 | Leung |
| 2021/0218424 A1* | 7/2021 | Pehlke ................ H04B 1/0078 |
| 2021/0218434 A1* | 7/2021 | Pehlke ................ H04L 5/14 |
| 2023/0238987 A1* | 7/2023 | Mori ................ H04B 1/40 455/552.1 |

FOREIGN PATENT DOCUMENTS

| | | |
|---|---|---|
| JP | 2002-176372 A | 6/2002 |
| JP | 2017-17691 A | 1/2017 |
| JP | 2019-68194 A | 4/2019 |
| WO | 2009/069730 A1 | 6/2009 |

OTHER PUBLICATIONS

Catt et al., "CR for TS38.101-1, Introduce Rx requirements for NR V2X single carrier", 3GPP TSG-RAN WG4 Meeting #95-e, R4-2008450 revised version of R4-2006262, May 25-Jun. 5, 2020, 6 pages.

* cited by examiner

RADIO-FREQUENCY CIRCUIT AND COMMUNICATION APPARATUS

CROSS REFERENCE TO RELATED APPLICATIONS

This is a continuation application of PCT International Application No. PCT/JP2021/036604 filed on Oct. 4, 2021, designating the United States of America, which is based on and claims priority of Japanese Patent Application No. 2020-171345 filed on Oct. 9, 2020. The entire disclosures of the above-identified applications, including the specifications, drawings, and claims are incorporated herein by reference in their entirety.

BACKGROUND

1. Field of the Disclosure

The present disclosure relates to a radio-frequency circuit and a communication apparatus.

2. Description of the Related Art

Multi-band and multi-mode radio-frequency circuits are required to transmit and receive multiple radio-frequency signals with low loss and high isolation.

U.S. Patent Application Publication No. 2016/0127015 discloses a reception module (transmission circuit) having a configuration in which multiple filters having different passbands are connected to an antenna via a multiplexer (switch).

SUMMARY

For example, simultaneous transmission (E-UTRAN New Radio-Dual Connectivity (EN-DC)) of radio-frequency signals in a 5th-generation (5G)-New Radio (NR) band and radio-frequency signals in a 4th-generation (4G)-Long Term Evolution (LTE) band is required in 3rd Generation Partnership Project (3GPP).

Radio-frequency circuits supporting a transmission application, such as EN-DC, are required to support other transmission applications typified by Vehicle to Everything (V2X) communication. Under a condition that the radio-frequency signals in multiple transmission applications are transmitted in the same band in such a case, different transmission applications have different required bandpass characteristics. Accordingly, it is difficult to optimize the impedance design of filters arranged on a signal path in accordance with the multiple transmission applications.

Accordingly, it is an aspect of the present disclosure to provide a radio-frequency circuit and a communication apparatus, which are capable of transmitting radio-frequency signals in multiple transmission applications with high quality.

A radio-frequency circuit according to one aspect of the present disclosure includes a first filter having a first passband including a first band; a second filter having a second passband including the first band; a first amplifier that amplifies a radio-frequency signal in the first band; and a switch that switches between a connection between the first filter and the first amplifier and a connection between the second filter and the first amplifier. Under a condition that a transmission of the radio-frequency signal in the first band is not V2X communication, the first filter is connected to the first amplifier via the switch. Under a condition that the transmission of the radio-frequency signal in the first band is the V2X communication, the second filter is connected to the first amplifier via the switch.

According to the present disclosure, it is possible to provide a radio-frequency circuit and a communication apparatus, which are capable of transmitting radio-frequency signals in multiple transmission applications with high quality.

DESCRIPTION OF THE PREFERRED EMBODIMENTS

Figure 1:
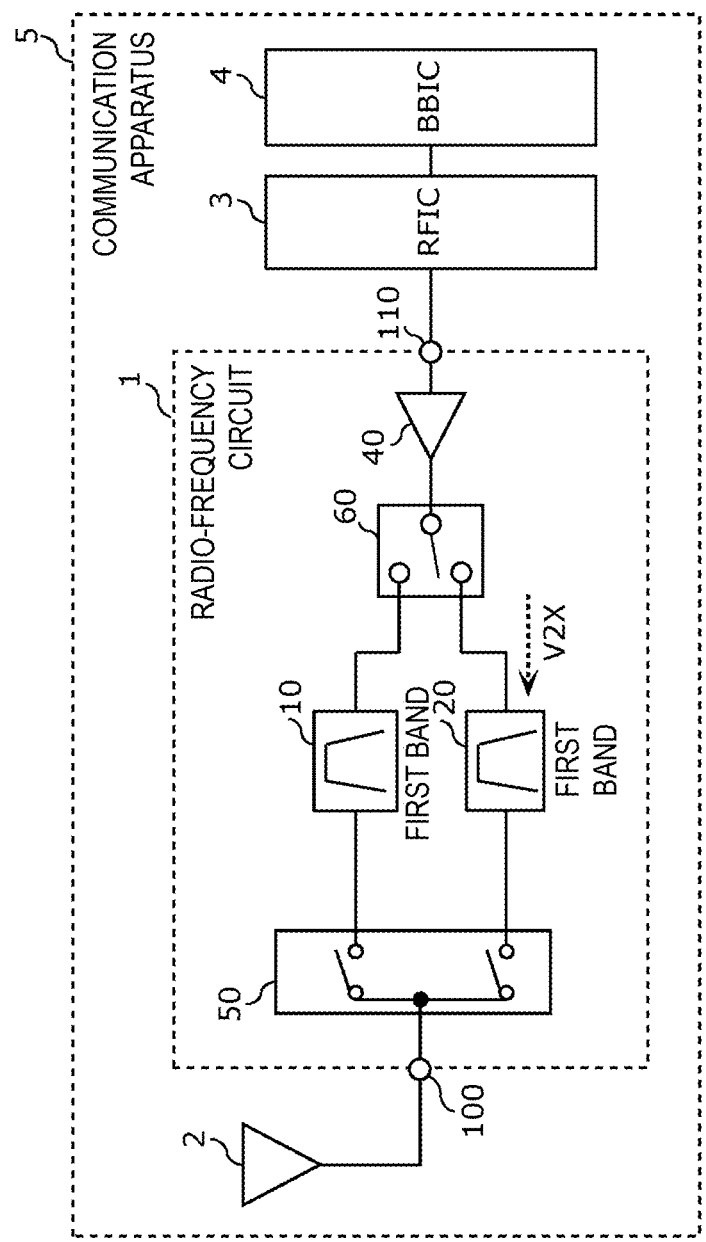
FIG. 1 is a diagram illustrating the circuit configurations of a radio-frequency circuit and a communication apparatus according to a first embodiment.

Embodiments of the present disclosure will herein be described in detail with reference to the drawings. All the embodiments described below indicate comprehensive or specific examples. Numerical values, shapes, materials, components, the arrangement of the components, the connection mode of the components, and so on, which are indicated in the embodiments described below, are only examples and are not intended to limit the present disclosure.

The respective drawings are schematic diagrams appropriately subjected to emphasis, omission, or adjustment of ratios in order to describe the present disclosure. The respective drawings are not necessarily strictly illustrated and may be different from the actual shapes, positional relationship, and ratios. The same reference numerals and letters are used in the respective drawings to identify substantially the same components and a duplicated description of such components may be omitted or simplified.

In the disclosure, "connected" includes not only direct connection with a connection terminal and/or a wiring conductor but also electrical connection via another circuit element. "Connected between A and B" means connection to A and B on a path between A and B.

First Embodiment

[1.1 Circuit Configurations of Radio-Frequency Circuit 1 and Communication Apparatus 5]

The circuit configurations of a radio-frequency circuit 1 and a communication apparatus 5 according to the present embodiment will be described with reference to FIG. 1. FIG. 1 is a diagram illustrating the circuit configurations of the radio-frequency circuit 1 and the communication apparatus 5 according to a first embodiment.

[1.1.1 Circuit Configuration of Communication Apparatus 5]

First, the circuit configuration of the communication apparatus 5 will be described. As illustrated in FIG. 1, the communication apparatus 5 according to the present embodiment includes the radio-frequency circuit 1, an antenna 2, a radio-frequency signal processing circuit (radio-frequency integrated circuit (RFIC)) 3, and a baseband signal processing circuit (baseband integrated circuit (BBIC)) 4.

The radio-frequency circuit 1 transmits a radio-frequency signal between the antenna 2 and the RFIC 3. A detailed circuit configuration of the radio-frequency circuit 1 will be described below.

The antenna 2 is connected to an antenna connection terminal 100 of the radio-frequency circuit 1. A radio-frequency signal output from the radio-frequency circuit 1 is transmitted through the antenna 2, and a radio-frequency signal is externally received through the antenna 2 and is supplied to the radio-frequency circuit 1.

The RFIC 3 is an example of a signal processing circuit that processes the radio-frequency signal. Specifically, the RFIC 3 performs signal processing, such as down-conversion, to a radio-frequency reception signal input through a reception path of the radio-frequency circuit 1 and supplies a reception signal resulting from the signal processing to the BBIC 4. In addition, the RFIC 3 performs signal processing, such as up-conversion, to a transmission signal supplied from the BBIC 4 and supplies a radio-frequency transmission signal resulting from the signal processing to a transmission path of the radio-frequency circuit 1. The RFIC 3 includes a control unit that controls switches, amplifiers, and so on in the radio-frequency circuit 1. Part of or all the function of the RFIC 3 serving as the control unit may be installed outside the RFIC 3. For example, part of or all the functions of the RFIC 3 serving as the control unit may be installed in, for example, the BBIC 4 or the radio-frequency circuit 1.

The BBIC 4 is a baseband signal processing circuit that performs signal processing using an intermediate frequency band lower than the frequencies of the radio-frequency signals transmitted by the radio-frequency circuit 1. For example, an image signal for image display and/or an audio signal for talking with a speaker is used as the signal processed in the BBIC 4.

In the communication apparatus 5 according to the present embodiment, the antenna 2 and the BBIC 4 are not essential components.

[1.1.2 Circuit Configuration of Radio-Frequency Circuit 1]

Next, the circuit configuration of the radio-frequency circuit 1 will be described. As illustrated in FIG. 1, the radio-frequency circuit 1 includes filters 10 and 20, a power amplifier 40, switches 50 and 60, the antenna connection terminal 100, and a radio-frequency input terminal 110.

The antenna connection terminal 100 is connected to the antenna 2. The radio-frequency input terminal 110 is a terminal for receiving the radio-frequency transmission signal from the outside of the radio-frequency circuit 1.

The power amplifier 40 is an example of a first amplifier. The power amplifier 40 is capable of amplifying the radio-frequency transmission signal in a first band (hereinafter referred to as a transmission signal) received from the RFIC 3 via the radio-frequency input terminal 110. The power amplifier 40 is connected between the radio-frequency input terminal 110 and the switch 60.

The power amplifier 40 is capable of operating in different amplification modes in accordance with transmission applications of the radio-frequency signals transmitted through the radio-frequency circuit 1, for example, in response to a control signal from the RFIC 3. This will be described in detail in [1.3 Amplification modes of power amplifier 40].

The first band, a second band, and a third band mean frequency bands defined in advance by standards bodies or the likes (for example, 3GPP or Institute of Electrical and Electronics Engineers (IEEE)) for a communication system that is built using a radio access technology (RAT). The second band and the third band will be described below. Although, for example, an LTE system, a 5G-NR system, a wireless local area network (WLAN) system, and so on are capable of being used as the communication system in the present embodiment, the communication system is not limited to these systems.

In the radio-frequency circuit 1 according to the present embodiment, the first band is, for example, n38 (2,570 MHz to 2,620 MHz) for 5G-NR.

The filter 10 is an example of a first filter. The filter 10 has a first passband including the first band. The filter 10 is connected to the antenna connection terminal 100 via the switch 50.

The filter 20 is an example of a second filter. The filter 20 has a second passband including the first band. The filter 20 is connected to the antenna connection terminal 100 via the switch 50.

In other words, in the present embodiment, both of the filters 10 and 20 have the passbands supporting the first band.

The filters 10 and 20 may each be any of, for example, (1) a surface acoustic wave (SAW) filter, (2) an acoustic wave filter using bulk acoustic waves (BAWs), (3) an LC resonant filter using an inductor and a capacitor, (4) a hybrid filter using an acoustic wave resonator, an inductor, and a capacitor, and (5) a dielectric filter and are not limited to these types of filters.

The switch 50 has two single pole single throw (SPST) switch elements. One terminal of each switch element is connected to the antenna connection terminal 100. The other terminal of each switch element is connected the filter 10 or 20. With this configuration, the switch 50 switches between connection and non-connection between the antenna connection terminal 100 and the filter 10 and switches between connection and non-connection between the antenna connection terminal 100 and the filter 20, for example, in response to a control signal from the RFIC 3. The number of the switch elements of the switch 50 is appropriately set in accordance with the number of the filters in the radio-frequency circuit 1.

The switch 60 is connected between the filters 10 and 20 and the power amplifier 40. Specifically, the switch 60 has a common terminal and two selection terminals. The common terminal of the switch 60 is connected to an output terminal of the power amplifier 40. The two selection terminals of the switch 60 are respectively connected to the filters 10 and 20. With this connection configuration, the switch 60 switches between connection between the filter 10 and the power amplifier 40 and a connection between the filter 20 and the power amplifier 40, for example, in response to a control signal from the RFIC 3.

An impedance matching circuit may be provided between the filters 10 and 20 and the power amplifier 40. In addition, an impedance matching circuit may be provided between the antenna connection terminal 100 and the filters 10 and 20.

Among the circuit elements in the radio-frequency circuit 1 illustrated in FIG. 1, the switch 50 is not necessarily be provided. In this case, the filters 10 and 20 may be directly connected to the antenna connection terminal 100.

Although the radio-frequency circuit 1 illustrated in FIG. 1 composes a transmission circuit including the power amplifier 40, the radio-frequency circuit 1 may be a reception circuit including a low-noise amplifier, instead of the power amplifier 40. In addition, the radio-frequency circuit 1 may be a transmission-reception circuit including the power amplifier 40 and a low-noise amplifier.

In the radio-frequency circuit 1 having the above configuration, under a condition that the transmission of the radio-frequency signal in the first band is not V2X communication, the filter 10 is connected to the power amplifier 40 via the switch 60 and the antenna connection terminal 100 is connected to the filter 10 via the switch 50. In contrast, under a condition that the transmission of the radio-frequency signal in the first band is the V2X communication, the filter 20 is connected to the power amplifier 40 via the switch 60 and the antenna connection terminal 100 is connected to the filter 20 via the switch 50.

With the above configuration, under a condition that the radio-frequency circuit 1 transmits the radio-frequency signal in the first band, the radio-frequency signal does not constantly pass through one filter. The radio-frequency signal in the first band, which is not used in the V2X communication, and the radio-frequency signal in the first band, which is used in the V2X communication, pass through the different filters 10 and 20 having the passbands including the same first band.

The radio-frequency circuit transmitting the radio-frequency signal is required to have different bandpass characteristics for different transmission applications. According to the present embodiment, the filter 10 or 20 is selected in accordance with the presence of the V2X communication and it is possible to optimize the impedance designs of the filters 10 and 20 in accordance with the different bandpass characteristics. Accordingly, since the radio-frequency signals in the respective multiple transmission applications are capable of passing through the different filters, it is possible to transmit the radio-frequency signals in the multiple transmission applications with high quality.

The first passband of the filter 10 may include the second band wider than the second passband of the filter 20. In other words, the second band includes the first band and is wider than the first band. The second band is, for example, n41 (2,496 MHz to 2,690 MHz) for 5G-NR.

[1.2 Transmission Applications]

The transmission applications will now be described. The transmission applications are communication techniques for transmitting the radio-frequency signals. The following transmission applications are exemplified.

(1) Transmission of a single radio-frequency signal in a single band in 3GPP
(2) Simultaneous transmission (including Carrier Aggregation (CA) and EN-DC) of multiple radio-frequency signals in 3GPP
(3) Uplink Multi-input Multi-output (UL-MIMO) in 3GPP
(4) Dual Connectivity in 3GPP
(5) Device to Device Proximity Services (ProSe) in 3GPP
(6) UE categories 0, M1, and M2 in 3GPP
(7) NB1 and NB2 in 3GPP
(8) V2X communication in 3GPP
(9) MIMO 802.11n in IEEE802.11 (WLAN)
(10) Beam forming 802.11ac in IEEE802.11 (WLAN)
(11) Multi User Multi-Input Multi-Output (MU-MIMO) 802.11ax in IEEE802.11 (WLAN)

[1.3 Amplification Modes of Power Amplifier 40]

The power amplifier 40 has a first amplification mode and a second amplification mode. Under a condition that the transmission application transmitting the radio-frequency signal in the first band is not the V2X communication, the first amplification mode is applied to the power amplifier 40. In other words, the first amplification mode is applied to the power amplifier 40 under a condition that the filter 10 is connected to the power amplifier 40 via the switch 60. In contrast, under a condition that the transmission of the radio-frequency signal in the first band is the V2X communication, the second amplification mode is applied to the power amplifier 40. In other words, the second amplification mode is applied to the power amplifier 40 under a condition that the filter 20 is connected to the power amplifier 40 via the switch 60.

Different methods are used in the first amplification mode and the second amplification mode as a method of adjusting at least one of power supply voltage and a bias signal, which are supplied to the power amplifier 40. An average power tracking (APT) method is capable of being used in the first amplification mode while an envelope tracking (ET) method is capable of being used in the second amplification mode.

In general, in the amplification mode using the ET method (hereinafter referred to as an ET mode), since the power supply voltage is applied based on the power of an input signal so that the power amplifier operates in a compression region, power consumption of the power amplifier is capable of being reduced, compared with the amplification mode using the APT method (hereinafter referred to as an APT mode), while signal distortion is increased. In contrast, in the APT mode, the reduction in the power consumption is smaller than that in the ET mode while the signal distortion is capable of being suppressed, compared with that in the ET mode.

Transmission power of the radio-frequency signal to which the transmission application of the V2X communication is applied is higher than the transmission power of the radio-frequency signal to which the transmission application of the V2X communication is not applied.

In order to resolve the above problem, as described above, operating the power amplifier 40 in the ET mode under a condition that the V2X communication is applied enables the power consumption in the V2X communication to be reduced. In addition, operating the power amplifier 40 in the APT mode under a condition that the V2X communication is not applied enables the signal distortion of the transmission signal to be suppressed.

Furthermore, since the transmission power of the radio-frequency signal to which the transmission application of the V2X communication is applied is higher than the transmission power of the radio-frequency signal to which the transmission application of the V2X communication is not applied, the electric-power handling performance of the filter 20 is desirably higher than the electric-power handling performance of the filter 10. From this viewpoint, the filter 20 is desirably greater in power-handling capability than the filter 10, and so, the chip size of the filter 20 is desirably greater than the chip size of the filter 10. In this case, since the power density of the chip of the filter 20 is capable being made lower than the power density of the chip of the filter 10, the electric-power handling performance of the filter 20 is improved, compared with that of the filter 10.

[1.4 Relationship Between Bands]

Figure 2:
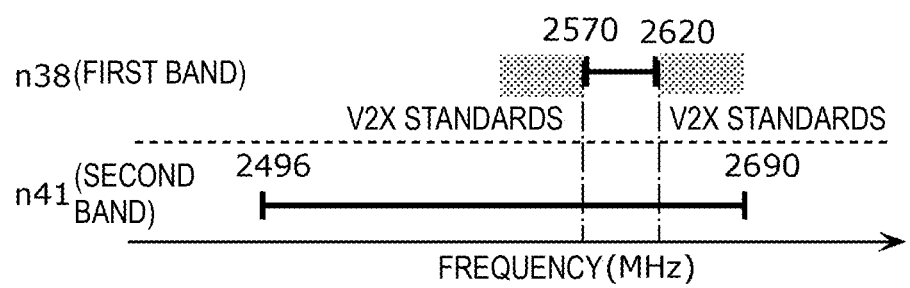
FIG. 2 is a diagram illustrating the relationship between bands in the first embodiment.

Next, the relationship between the bands in the present embodiment will now be described. FIG. 2 is a diagram illustrating the relationship between the bands in the first embodiment.

As illustrated in FIG. 2, the first band is, for example, n38 for 5G-NR. Here, under a condition that the transmission application in the transmission of the radio-frequency signal in the first band is the V2X communication, the required amounts of attenuation in bands near the lower-frequency side of n38 and the required amounts of attenuation in bands near the higher-frequency side of n38 are greater than those of another transmission application as the bandpass characteristics of a signal path on which the radio-frequency signal is transmitted. Accordingly, the filter supporting the V2X communication is required to have the high-attenuation bandpass characteristics, compared with those of the filter supporting another transmission application. However, if this is realized, for example, the insertion loss in the passband is increased. Consequently, it is necessary to adopt different impedance designs for the filter supporting the V2X communication and the filer supporting another transmission application despite that the filter supporting the V2X communication and the filer supporting another transmission application support the same band.

From this viewpoint, the radio-frequency circuit 1 of the present embodiment has the configuration in which the different filters are arranged for the different transmission applications despite that the filters support the same band. Specifically, the filter 20 supporting the V2X communication of the first band and the filter 10 supporting another transmission application of the first band are separately provided despite that the filter 20 and the filter 10 have the passbands supporting the first band.

As described above, the first passband of the filter 10 may include the second band wider than the second passband of the filter 20. In other words, the second band includes the first band and is wider than the first band. The second band is, for example, n41 for 5G-NR, as illustrated in FIG. 2. In this case, the radio-frequency signal passes through the filter 20 in response to the switching of the switches 50 and 60 under a condition that the V2X communication of n38 is performed, and the radio-frequency signal passes through the filter 10 in response to the switching of the switches 50 and 60 under a condition that another transmission application of n38 is performed. In addition, the radio-frequency signal passes through the filter 10 in response to the switching of the switches 50 and 60 under a condition that the radio-frequency signal of n41 is transmitted. In other words, the filter 10 is a Co-Band filter supporting both n41 and n38 while the filter 20 is a filter specialized for the V2X communication of n38.

With the above configuration, since the filter 10 or 20 is selected based on the presence of the V2X communication, it is possible to optimize the impedance designs of the filters 10 and 20. In addition, since the filter 10 is the Co-Band filter supporting the multiple bands, the radio-frequency signals in the multiple bands pass through the same filter. Accordingly, it is possible to reduce the size of the radio-frequency circuit 1 while transmitting the radio-frequency signals in the multiple transmission applications with high quality.

In the radio-frequency circuit 1 according to the present embodiment, the first band may be a partial band (supporting the V2X) of n77 (3,300 MHz to 4,200 MHz) for 5G-NR and the second band may be n77 for 5G-NR. In addition, the first band may be a partial band (supporting the V2X) of n78 (3,300 MHz to 3,800 MHz) for 5G-NR and the second band may be n78 for 5G-NR. Furthermore, the first band may be a partial band (supporting the V2X) of n79 (4,400 MHz to 5,000 MHz) for 5G-NR and the second band may be n79 for 5G-NR.

[1.5 Circuit Configurations of Radio-Frequency Circuits According to Modifications]

Figure 3:
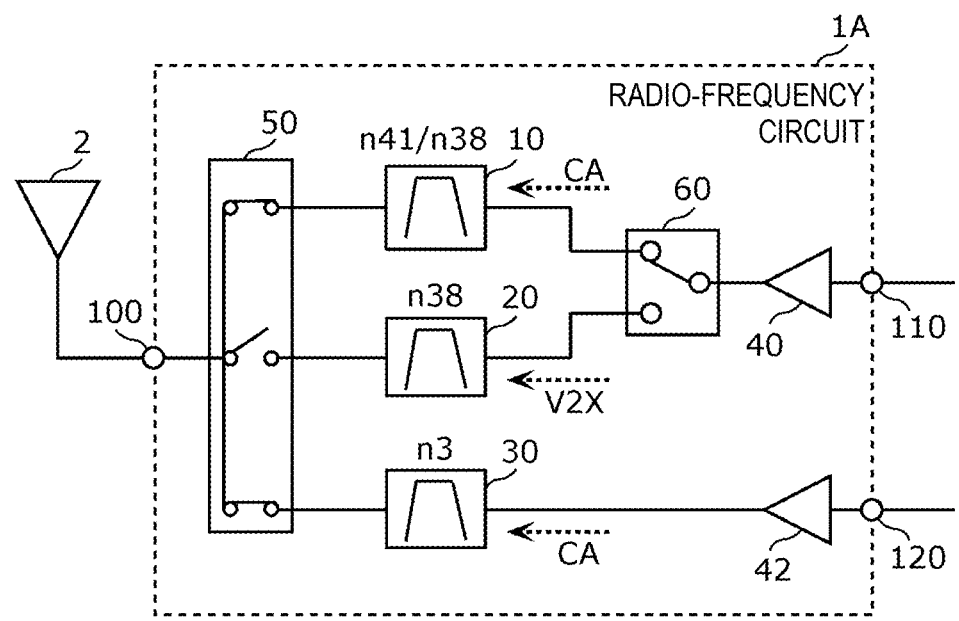
FIG. 3 is a diagram illustrating the circuit configuration of a radio-frequency circuit according to a first modification of the first embodiment.

FIG. 3 is a diagram illustrating the circuit configuration of a radio-frequency circuit 1A according to a first modification of the first embodiment. As illustrated in FIG. 3, the radio-frequency circuit 1A includes the filters 10 and 20 and a filter 30, the power amplifier 40 and a power amplifier 42, the switches 50 and 60, the antenna connection terminal 100, and the radio-frequency input terminal 110 and a radio-frequency input terminal 120. The radio-frequency circuit 1A according to the present modification differs in the configuration from the radio-frequency circuit 1 according to the first embodiment in that the filter 30, the power amplifier 42, and the radio-frequency input terminal 120 are added. A description of the components in the radio-frequency circuit 1A according to the present modification, which are the same as those in the radio-frequency circuit 1 according to the first embodiment, is omitted and the description focuses on different components.

The radio-frequency input terminal 120 is a terminal for receiving the radio-frequency transmission signal from the outside of the radio-frequency circuit 1A.

The power amplifier 42 is an example of a second amplifier. The power amplifier 42 is capable of amplifying the radio-frequency transmission signal in the third band (hereinafter referred to as the transmission signal) input through the radio-frequency input terminal 120. The power amplifier 42 is connected between the radio-frequency input terminal 120 and the filter 30.

In the radio-frequency circuit 1A according to the present modification, the first band is, for example, n38 for 5G-NR (e.g., 2,570 MHz to 2,620 MHz), the second band is, for example, n41 for 5G-NR (e.g., 2,496 MHz to 2,690 MHz), and the third band is, for example, n3 (1,710 MHz to 1,785 MHz) for 5G-NR.

The filter 10 is an example of the first filter. The filter 10 has the first passband including the second band. The filter 10 is connected to the antenna connection terminal 100 via the switch 50.

The filter 20 is an example of the second filter. The filter 20 has the second passband including the first band. The filter 20 is connected to the antenna connection terminal 100 via the switch 50.

The filter 30 is an example of a third filter. The filter 30 has a third passband including the third band. The filter 30 is connected to the antenna connection terminal 100 via the switch 50.

The switch 50 has three SPST switch elements. One terminal of each switch element is connected to the antenna connection terminal 100. The other terminal of each switch element is connected to the filter 10, 20, or 30. With this configuration, the switch 50 switches between connection and non-connection between the antenna connection terminal 100 and the filter 10, switches between connection and non-connection between the antenna connection terminal 100 and the filter 20, and switches between connection and non-connection between the antenna connection terminal 100 and the filter 30, for example, in response to a control signal from the RFIC 3. The number of the switch elements of the switch 50 is appropriately set in accordance with the number of the filters in the radio-frequency circuit 1A.

Among the circuit elements in the radio-frequency circuit 1A illustrated in FIG. 3, the switch 50 is not necessarily be provided. In this case, the filters 10, 20, and 30 may be directly connected to the antenna connection terminal 100.

Although the radio-frequency circuit 1A illustrated in FIG. 3 composes a transmission circuit including the power amplifiers 40 and 42, the radio-frequency circuit 1A may be a reception circuit including a low-noise amplifier, instead of the power amplifiers 40 and 42. In addition, the radio-frequency circuit 1A may be a transmission-reception circuit including the power amplifiers 40 and 42 and a low-noise amplifier.

In the radio-frequency circuit 1A having the above configuration, under a condition that the transmission of the radio-frequency signal in the first band is not the V2X communication and the radio-frequency signal in the first band or the second band and the radio-frequency signal in the third band are simultaneously transmitted, the filter 10 is connected to the power amplifier 40 via the switch 60. In this case, the filter 10 is connected to the antenna connection terminal 100 and the filter 30 is connected to the antenna connection terminal 100 via the switch 50.

Under a condition that the transmission of the radio-frequency signal in the first band is the V2X communication, the filter 20 is connected to the power amplifier 40 via the switch 60. In this case, the filter 20 is connected to the antenna connection terminal 100 via the switch 50.

With the above configuration, under a condition that the radio-frequency circuit 1A transmits the radio-frequency signal in the first band, the radio-frequency signal does not constantly pass through one filter. The radio-frequency signal in the first band, which is not used in the V2X communication, and the radio-frequency signal in the first band, which is used in the V2X communication, pass through the different filters 10 and 20 having the passbands including the same first band. Under a condition that the radio-frequency signal in the first band is not used in the V2X communication, the radio-frequency signal in the first band or the second band and the radio-frequency signal in the third band are capable of being simultaneously transmitted.

Accordingly, the radio-frequency circuit 1A is capable of performing the V2X communication and CA, among the multiple transmission applications.

Figure 4:
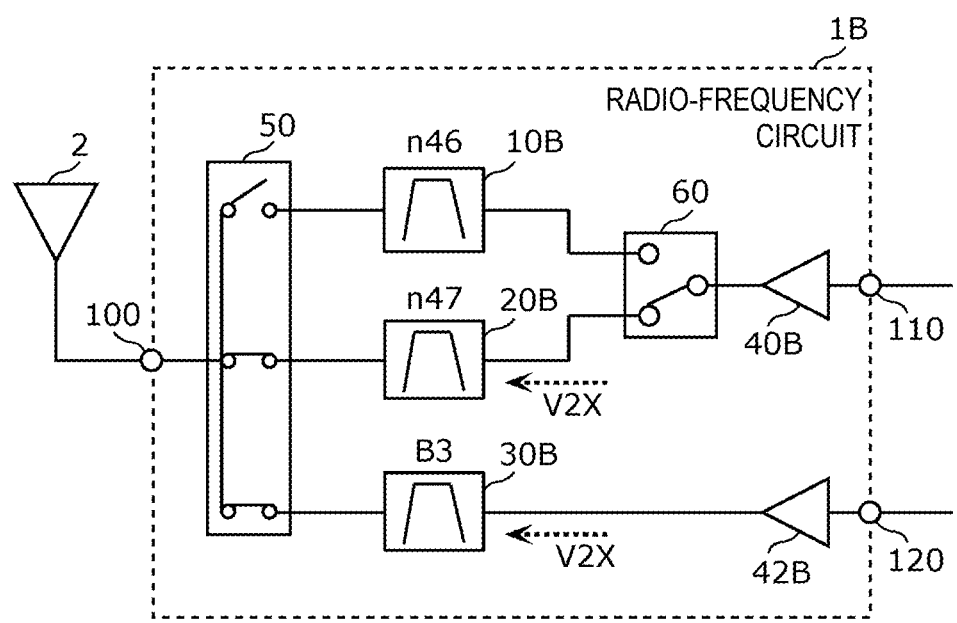
FIG. 4 is a diagram illustrating the circuit configuration of a radio-frequency circuit according to a second modification of the first embodiment.

FIG. 4 is a diagram illustrating the circuit configuration of a radio-frequency circuit 1B according to a second modification of the first embodiment. As illustrated in FIG. 4, the radio-frequency circuit 1B includes filters 10B, 20B, and 30B, power amplifiers 40B and 42B, the switches 50 and 60, the antenna connection terminal 100, and the radio-frequency input terminals 110 and 120. The radio-frequency circuit 1B according to the present modification differs from the radio-frequency circuit 1A according to the first modification in the passbands of the filters 10B to 30B and the amplification characteristics of the power amplifiers 40B and 42B. A description of the components in the radio-frequency circuit 1B according to the present modification, which are the same as those in the radio-frequency circuit 1A according to the first modification, is omitted and the description focuses on different components.

The power amplifier 40B is an example of the first amplifier. The power amplifier 40B is capable of amplifying the radio-frequency transmission signals in the first band and the second band (hereinafter referred to as the transmission signals), which are input through the radio-frequency input terminal 110.

The power amplifier 42B is an example of the second amplifier. The power amplifier 42B is capable of amplifying the radio-frequency transmission signal in the third band (hereinafter referred to as the transmission signal) input through the radio-frequency input terminal 120.

In the radio-frequency circuit 1B according to the present modification, the first band is, for example, n47 (5,855 MHz to 5,925 MHz) for 5G-NR, the second band is, for example, n46 (5,470 MHz to 5,925 MHz) for 5G-NR, and the third band is, for example, Band 3 (B3) (1,710 MHz to 1,785 MHz) for LTE.

The filter 10B is an example of the first filter. The filter 10B has the first passband including the second band. The filter 10B is connected to the antenna connection terminal 100 via the switch 50.

The filter 20B is an example of the second filter. The filter 20B has the second passband including the first band. The filter 20B is connected to the antenna connection terminal 100 via the switch 50.

The filter 30B is an example of the third filter. The filter 30B has the third passband including the third band. The filter 30B is connected to the antenna connection terminal 100 via the switch 50.

Among the circuit elements in the radio-frequency circuit 1B illustrated in FIG. 4, the switch 50 is not necessarily be provided. In this case, the filters 10B, 20B, and 30B may be directly connected to the antenna connection terminal 100.

Although the radio-frequency circuit 1B illustrated in FIG. 4 composes a transmission circuit including the power amplifiers 40B and 42B, the radio-frequency circuit 1B may be a reception circuit including a low-noise amplifier, instead of the power amplifiers 40B and 42B. In addition, the radio-frequency circuit 1B may be a transmission-reception circuit including the power amplifiers 40B and 42B and a low-noise amplifier.

In the radio-frequency circuit 1B having the above configuration, under a condition that the transmission of the radio-frequency signal in the first band is not the V2X communication and the radio-frequency signal in the second band is transmitted alone, the filter 10B is connected to the power amplifier 40B via the switch 60. In this case, the filter 10B is connected to the antenna connection terminal 100 via the switch 50.

Under a condition that the transmission of the radio-frequency signal in the first band is the V2X communication, the transmission application transmitting the radio-frequency signal in the third band is the V2X communication, and the radio-frequency signal in the first band and the radio-frequency signal in the third band are simultaneously transmitted, the filter 20B is connected to the power amplifier 40B via the switch 60. In this case, the filter 20B is connected to the antenna connection terminal 100 and the filter 30B is connected to the antenna connection terminal 100 via the switch 50.

With the above configuration, it is possible to perform the single transmission of the radio-frequency signal in the second band, the transmission application of which is not the V2X communication, and the simultaneous transmission of the radio-frequency signal in the first band used in the V2X communication and the radio-frequency signal in the third band used in the V2X communication.

Second Embodiment

Although the V2X communication in 3GPP is exemplified as the transmission application in the first embodiment, MU-MIMO in IEEE802.11 (WLAN) is exemplified as the transmission application in the present embodiment.

[2.1 Circuit Configurations of Radio-Frequency Circuit 1C and Communication Apparatus 5C]

Figure 5:
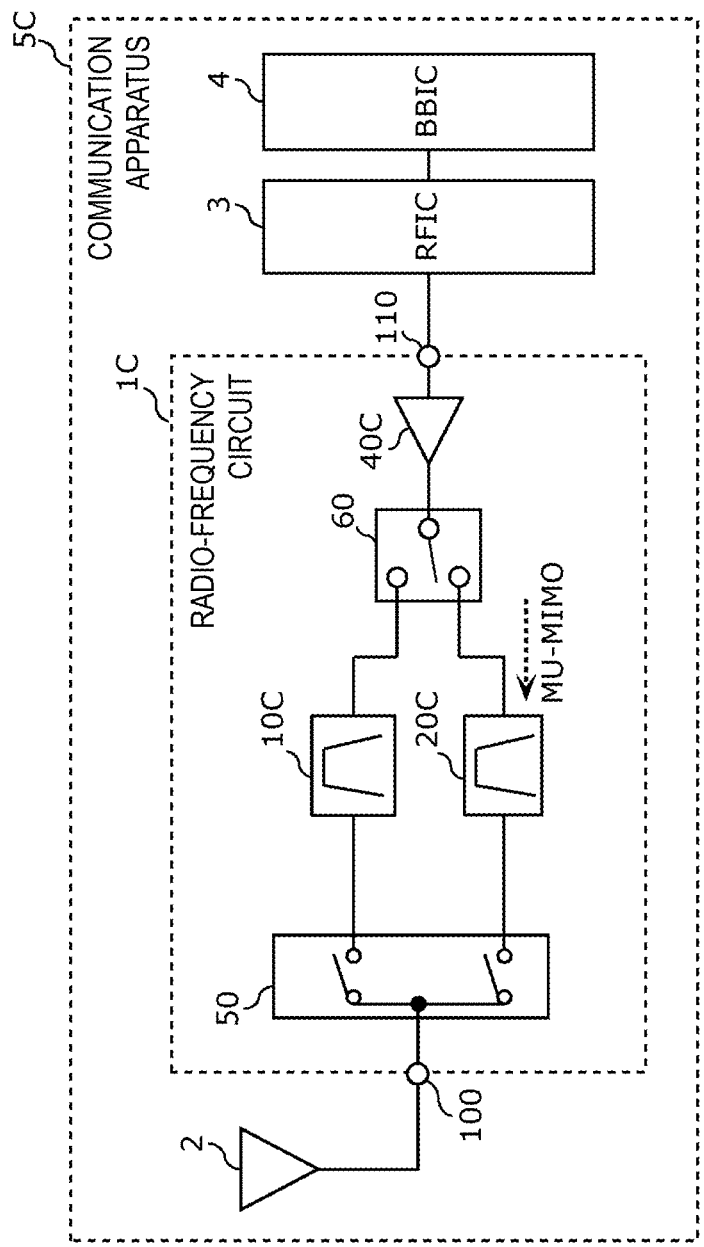
FIG. 5 is a diagram illustrating the circuit configurations of a radio-frequency circuit and a communication apparatus according to a second embodiment.

The circuit configurations of a radio-frequency circuit 1C and a communication apparatus 5C according to the present embodiment will be described with reference to FIG. 5. FIG. 5 is a diagram illustrating the circuit configurations of the radio-frequency circuit 1C and the communication apparatus 5C according to a second embodiment.

[2.1.1. Circuit Configuration of Communication Apparatus 5C]

First, the circuit configuration of the communication apparatus 5C will be described. As illustrated in FIG. 5, the communication apparatus 5C according to the present embodiment includes the radio-frequency circuit 1C, the antenna 2, the RFIC 3, and the BBIC 4. The communication apparatus 5C according to the present embodiment differs from the communication apparatus 5 according to the first embodiment only in the configuration of the radio-frequency circuit 1C. Accordingly, the configuration of the radio-frequency circuit 1C will be described below.

[2.1.2 Circuit Configuration of Radio-Frequency Circuit 1C]

Next, the circuit configuration of the radio-frequency circuit 1C will be described. As illustrated in FIG. 5, the radio-frequency circuit 1C includes filters 10C and 20C, a power amplifier 40C, the switches 50 and 60, the antenna connection terminal 100, and the radio-frequency input terminal 110. The radio-frequency circuit 1C according to the present embodiment differs from the radio-frequency circuit 1 according to the first embodiment in the passbands of the filters 10C and 20C and the amplification characteristics of the power amplifier 40C. A description of the components in the radio-frequency circuit 1C according to the present embodiment, which are the same as those in the radio-frequency circuit 1 according to the first embodiment, is omitted and the description focuses on different components.

The antenna connection terminal 100 is connected to the antenna 2. The radio-frequency input terminal 110 is a terminal for receiving the radio-frequency transmission signal from the outside of the radio-frequency circuit 1C.

The power amplifier 40C is an example of the first amplifier. The power amplifier 40C is capable of amplifying the radio-frequency transmission signal in the first band (hereinafter referred to as the transmission signal) input through the radio-frequency input terminal 110. The power amplifier 40C is connected between the radio-frequency input terminal 110 and the switch 60.

The filter 10C is an example of the first filter. The filter 10C has the first passband including the first band. The filter 10C is connected to the antenna connection terminal 100 via the switch 50.

The filter 20C is an example of the second filter. The filter 20C has the second passband including part of the first band. The filter 20C is connected to the antenna connection terminal 100 via the switch 50.

Figure 6:
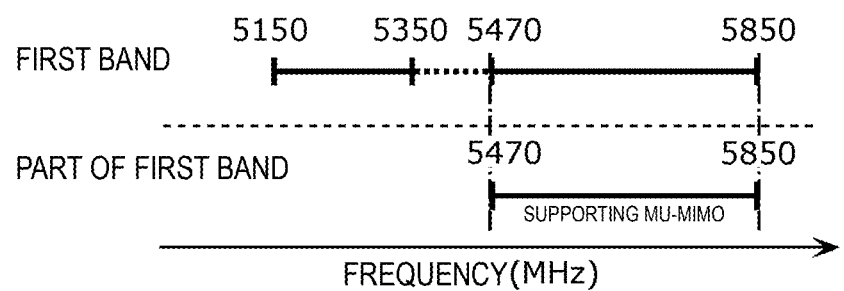
FIG. 6 is a diagram illustrating the relationship between bands in the second embodiment.

FIG. 6 is a diagram illustrating the relationship between the bands in the second embodiment. As illustrated in FIG. 6, in the radio-frequency circuit 1C according to the present embodiment, the first band covers, for example, 5,150 MHz to 5,850 MHz and the part of the first band covers 5,470 MHz to 5,850 MHz.

Among the circuit elements in the radio-frequency circuit 1C illustrated in FIG. 5, the switch 50 is not necessarily be provided. In this case, the filters 10C and 20C may be directly connected to the antenna connection terminal 100.

Although the radio-frequency circuit 1C illustrated in FIG. 5 composes a transmission circuit including the power amplifier 40C, the radio-frequency circuit 1C may be a reception circuit including a low-noise amplifier, instead of the power amplifier 40C. In addition, the radio-frequency circuit 1C may be a transmission-reception circuit including the power amplifier 40C and a low-noise amplifier.

In the radio-frequency circuit 1C having the above configuration, under a condition that the transmission of the radio-frequency signal in the first band is not MU-MIMO, the filter 10C is connected to the power amplifier 40C via the switch 60 and the antenna connection terminal 100 is connected to the filter 10C via the switch 50. In contrast, under a condition that the transmission of the radio-frequency signal in the first band is MU-MIMO, the filter 20C is connected to the power amplifier 40C via the switch 60 and the antenna connection terminal 100 is connected to the filter 20C via the switch 50.

Here, under a condition that the transmission of the transmission of the radio-frequency signal in the first band is MU-MIMO, the digital modulation method of the radio-frequency signal is 1024 Quadrature Amplitude Modulation (QAM) and the number of bits in MU-MIMO is greater than that in another transmission application. Accordingly, under a condition that the transmission application is MU-MIMO, Error Vector Magnitude (EVM) is required to have a high value. For this end, the filter supporting MU-MIMO is required to have the narrow-band and high-attenuation band-pass characteristics, compared with those of the filter supporting another transmission application, in order to further suppress spurious noise. Accordingly, it is necessary to set different passband widths for the filter supporting MU-MIMO and the filter supporting another transmission application to adopt different impedance designs.

From this viewpoint, the radio-frequency circuit 1C of the present embodiment has the configuration in which the different filters are arranged for the different transmission applications despite that the radio-frequency signals in the same first band are transmitted. Specifically, the filter 20 supporting MU-MIMO of the first band and the filter 10 supporting another transmission application of the first band are separately provided despite that the filter 20 and the filter 10 support the first band.

With the radio-frequency circuit 1C according to the present embodiment, under a condition that the radio-frequency circuit 1C transmits the radio-frequency signal in the first band, the radio-frequency signal does not constantly pass through one filter. The radio-frequency signal in the first band, which is not used in MU-MIMO, and the radio-frequency signal in the first band, which is used in MU-MIMO, pass through the different filters 10C and 20C.

Since the filter 10C or 20C is selected based on the presence of MU-MIMO, it is possible to optimize the passbands and the impedance designs of the filters 10C and 20C. Accordingly, since the radio-frequency signals in the multiple different transmission applications pass through the different filters, it is possible to transmit the radio-frequency signals in the multiple transmission applications with high quality.

[3. Advantages and so On]

As described above, the radio-frequency circuit 1 according to the first embodiment includes the filter 10 having the first passband including the first band; the filter 20 having the second passband including the first band; the power amplifier 40 that amplifies a radio-frequency signal in the first band; and the switch 60 that switches between connection between the filter 10 and the power amplifier 40 and a connection between the filter 20 and the power amplifier 40. Under a condition that the transmission of the radio-frequency signal in the first band is not the V2X communication, the filter 10 is connected to the power amplifier 40 via the switch 60. Under a condition that the transmission of the radio-frequency signal in the first band is the V2X communication, the filter 20 is connected to the power amplifier 40 via the switch 60.

With the above configuration, under a condition that the radio-frequency circuit 1 transmits the radio-frequency signal in the first band, the radio-frequency signal does not pass through one filter having the passband including the first band. The radio-frequency signal in the first band, which is not used in the V2X communication, and the radio-frequency signal in the first band, which is used in the V2X communication, pass through the different filters 10 and 20 having the passbands including the same first band. In other words, since the filter 10 or 20 is selected in accordance with the presence of the V2X communication, it is possible to optimize the impedance designs of the filters 10 and 20. Accordingly, since the radio-frequency signals in the respective multiple transmission applications are capable of passing through the different filters, it is possible to transmit the radio-frequency signals in the multiple transmission applications with high quality.

In the radio-frequency circuit 1, the first band may be a frequency band capable of being used in transmission. Under a condition that the transmission of the radio-frequency signal in the first band is not the V2X communication, the power amplifier 40 may operate in the APT method. Under a condition that the transmission of the radio-frequency signal in the first band is the V2X communication, the power amplifier 40 may operate in the ET method.

The transmission power of the radio-frequency signal to which the transmission application of the V2X communication is applied is higher than the transmission power of the radio-frequency signal to which the transmission application of the V2X communication is not applied. In order to resolve the above problem, as described above, operating the power amplifier 40 in the ET mode under a condition that the V2X communication is applied enables the power consumption in the V2X communication to be reduced. In addition, operating the power amplifier 40 in the APT mode under a condition that the V2X communication is not applied enables the signal distortion of the transmission signal to be suppressed.

The bandwidth of the radio-frequency signal to which the transmission application of the V2X communication is not applied may be different from, for example, may be wider than the bandwidth of the radio-frequency signal to which the transmission application of the V2X communication is applied. Accordingly, the power supply voltage of the power amplifier 40 may be switched between the case in which the transmission application transmitting the radio-frequency signal in the first band is not the V2X communication and the case in which the transmission application transmitting the radio-frequency signal in the first band is the V2X communication. For example, the power supply voltage of the power amplifier 40 under a condition that the transmission of the radio-frequency signal in the first band is not the V2X communication may be higher than the power supply voltage of the power amplifier 40 under a condition that the transmission of the radio-frequency signal in the first band is the V2X communication.

In the radio-frequency circuit 1, the first band may be a frequency band capable of being used in transmission. The filter 20 may be greater in power handling capability, and size, than the filter 10.

In this case, since the power density of the chip of the filter 20 is capable being made lower than the power density of the chip of the filter 10, the electric-power handling performance of the filter 20 is improved, compared with that of the filter 10.

In the radio-frequency circuit 1, the first passband may include the second band wider than the first band and may be wider than the second passband.

With the above configuration, since the filter 10 is the Co-Band filter supporting the first band and the second band, the radio-frequency signals in the multiple bands pass through the same filter. Accordingly, it is possible to reduce the size of the radio-frequency circuit 1 while transmitting the radio-frequency signals in the multiple transmission applications with high quality.

In the radio-frequency circuit 1, the first band may be n38 for 5G-NR and the second band may be n41 for 5G-NR.

The radio-frequency circuit 1A may further include the filter 30 having the third passband including the third band and the power amplifier 42 that is connected to the filter 30 and that amplifies a radio-frequency signal in the third band. Under a condition that the transmission of the radio-frequency signal in the first band is not the V2X communication and the radio-frequency signal in the first band or the second band and the radio-frequency signal in the third band are simultaneously transmitted, the filter 10 may be connected to the power amplifier 40 via the switch 60. Under a condition that the transmission of the radio-frequency signal in the first band is the V2X communication, the filter 20 may be connected to the power amplifier 40 via the switch 60.

With the above configuration, under a condition that the radio-frequency signal in the first band is not used in the V2X communication, the radio-frequency signal in the first band or the second band and the radio-frequency signal in the third band are capable of being simultaneously transmitted. Accordingly, the radio-frequency circuit 1A is capable of performing the V2X communication and CA, among the multiple transmission applications.

The radio-frequency circuit 1B may further include the filter 30B having the third passband including the third band and the power amplifier 42B that is connected to the filter 30B and that amplifies a radio-frequency signal in the third band. Under a condition that the transmission of the radio-frequency signal in the first band is not the V2X communication and the radio-frequency signal in the second band is transmitted alone, the filter 10B may be connected to the power amplifier 40B via the switch 60. Under a condition that the transmission of the radio-frequency signal in the first band is the V2X communication, the transmission application transmitting the radio-frequency signal in the third band is the V2X communication, and the radio-frequency signal in the first band and the radio-frequency signal in the third band are simultaneously transmitted, the filter 20B may be connected to the power amplifier 40B via the switch 60.

With the above configuration, it is possible to perform the single transmission of the radio-frequency signal in the second band, the transmission application of which is not the V2X communication, and the simultaneous transmission of the radio-frequency signal in the first band used in the V2X communication and the radio-frequency signal in the third band used in the V2X communication.

In the radio-frequency circuits 1A and 1B, the third band may be n3 for 5G-NR or Band3 for LTE.

The radio-frequency circuit 1C according to the second embodiment includes the filter 10C having the first passband including the first band; the filter 20C having the second passband that is part of the first band; the power amplifier 40C that amplifies a radio-frequency signal in the first band; and the switch 60 that switches between connection between the filter 10C and the power amplifier 40C and a connection between the filter 20C and the power amplifier 40C. Under a condition that the transmission of the radio-frequency signal in the first band is not MU-MIMO, the filter 10C is connected to the power amplifier 40C via the switch 60. Under a condition that the transmission of the radio-frequency signal in the first band is MU-MIMO, the filter 20C is connected to the power amplifier 40C via the switch 60.

With the above configuration, under a condition that the radio-frequency circuit 1C transmits the radio-frequency signal in the first band, the radio-frequency signal does not pass through one filter having the passband of the first band. The radio-frequency signal in the first band, which is not used in MU-MIMO, and the radio-frequency signal in the first band, which is used in MU-MIMO, pass through the different filters 10C and 20C. In other words, since the filter 10C or 20C is selected based on the presence of MU-MIMO, it is possible to optimize the passbands and the impedance designs of the filters 10C and 20C. Accordingly, since the radio-frequency signals in the multiple different transmission applications pass through the different filters, it is possible to transmit the radio-frequency signals in the multiple transmission applications with high quality.

In the radio-frequency circuit 1C, the first band may cover 5,150 MHz to 5,850 MHz and the part of the first band may cover 5,470 MHz to 5,850 MHz.

The communication apparatus 5 includes the RFIC 3 that processes a radio-frequency signal and the radio-frequency circuit 1 that transmits the radio-frequency signal between the RFIC 3 and the antenna 2.

With the above configuration, the communication apparatus 5 is capable of achieving the same advantages as those of the radio-frequency circuit 1 described above.

OTHER EMBODIMENTS

Although the radio-frequency circuits and the communication apparatuses according to the present disclosure are described above based on the first and second embodiments, the radio-frequency circuits and the communication apparatuses according to the present disclosure are not limited to the above embodiments. Other embodiments realized by combining arbitrary components in the above embodiments, modifications resulting from making various modifications supposed by the person skilled in the art to the above embodiments without departing from the sprit and scope of the present disclosure, various devices incorporating the radio-frequency circuits and the communication apparatuses are also included in the present disclosure.

For example, other circuit elements, lines, and so on may be provided between the paths connecting the respective circuit elements and signal paths disclosed in the drawings in the circuit configurations of the radio-frequency circuits and the communication apparatuses according to the embodiments described above.

Although the bands for 5G-NR or LTE and the communication bands for the radio local area network are used in the above embodiments, the communication bands for other radio access techniques may be used, in addition to or instead of the above bands. For example, millimeter bands of seven gigahertz or higher may be used. In this case, the radio-frequency circuit 1, the antenna 2, and the RFIC 3 may compose a millimeter antenna module and, for example, distributed constant filters may be used as the filters.

The present disclosure is widely applicable to a communication device, such as a mobile phone, and/or a communication device mounted in a vehicle as the radio-frequency circuit arranged in a front-end unit.

What is claimed is:

1. A radio-frequency circuit comprising:
   a first filter having a first passband including a first band capable of being used in transmission;
   a second filter having a second passband including the first band;
   a first amplifier that amplifies a power of a radio-frequency signal in the first band; and
   a switch that switches between a connection between the first filter and the first amplifier and a connection between the second filter and the first amplifier,
   wherein, under a condition that a transmission of the radio-frequency signal in the first band is not a V2X communication, the first filter is connected to the first amplifier via the switch and the first amplifier operates in an average power tracking method, and
   wherein, under a condition the transmission of the radio-frequency signal in the first band is the V2X communication, the second filter is connected to the first amplifier via the switch and the first amplifier operates in an envelope tracking method.

2. The radio-frequency circuit according to claim 1, wherein the second filter is greater in power-handling capability than the first filter.

3. The radio-frequency circuit according to claim 1, wherein the first passband includes a second band wider than the first band, and
   wherein the first passband is wider than the second passband.

4. The radio-frequency circuit according to claim 3, wherein the first band is n38 for 5th-generation-New Radio, and
   wherein the second band is n41 for 5th-generation-New Radio.

5. The radio-frequency circuit according to claim 3, further comprising:
   a third filter having a third passband including a third band; and
   a second amplifier that is connected to the third filter and that amplifies a radio-frequency signal in the third band,
   wherein, under a condition that the transmission of the radio-frequency signal in the first band is not the V2X communication and the radio-frequency signal in the first band or the second band and the radio-frequency signal in the third band are simultaneously transmitted, the first filter is connected to the first amplifier via the switch.

6. The radio-frequency circuit according to claim 5, wherein the third band is n3 for 5th-generation-New Radio or Band3 for Long Term Evolution.

7. The radio-frequency circuit according to claim 3, further comprising:
   a third filter having a third passband including a third band; and
   a second amplifier that is connected to the third filter and that amplifies a radio-frequency signal in the third band,
   wherein, under a condition that the transmission of the radio-frequency signal in the first band is not the V2X communication and the radio-frequency signal in the second band is transmitted alone, the first filter is connected to the first amplifier via the switch, and wherein, under a condition that the transmission of the radio-frequency signal in the first band is the V2X communication, the transmission application transmitting the radio-frequency signal in the third band is the V2X communication, and the radio-frequency signal in the first band and the radio-frequency signal in the third band are simultaneously transmitted, the second filter is connected to the first amplifier via the switch.

8. The radio-frequency circuit according to claim 7, wherein the third band is n3 for 5th-generation-New Radio or Band3 for Long Term Evolution.

9. The radio-frequency circuit according to claim 1, wherein the first passband is wider than the second passband.

10. The radio-frequency circuit according to claim 1, wherein the first passband includes a second band wider than the first band.

11. A communication apparatus comprising:
a signal processing circuit that processes a radio-frequency signal; and
the radio-frequency circuit according to claim 1, which transmits the radio-frequency signal between the signal processing circuit and an antenna.

12. A radio-frequency circuit comprising:
a first filter having a first passband including a first band capable of being used in transmission;
a second filter having a second passband including the first band;
a first amplifier that amplifies a power of a radio-frequency signal in the first band; and
means for switching between a connection between the first filter and the first amplifier and a connection between the second filter and the first amplifier,
wherein, under a condition that a transmission of the radio-frequency signal in the first band is not V2X communication, the first filter is connected to the first amplifier via the means for switching and the first amplifier operates in an average power tracking method, and
wherein, under a condition that the of the radio-frequency signal in the first band is the V2X communication, the second filter is connected to the first amplifier via the means for switching and the first amplifier operates in an envelope tracking method.

13. The radio-frequency circuit according to claim 12, wherein the first passband is wider than the second passband.

14. The radio-frequency circuit according to claim 12, wherein the first passband includes a second band wider than the first band.

15. A communication apparatus comprising:
a signal processing circuit that processes a radio-frequency signal; and
the radio-frequency circuit according to claim 12, which transmits the radio-frequency signal between the signal processing circuit and an antenna.

16. A radio-frequency circuit comprising:
a first filter having a first passband including a first band and a second band wider than the first band,
a second filter having a second passband including the first band, wherein the first passband is wider than the second passband;
a third filter having a third passband including a third band;
a first amplifier that amplifies a radio-frequency signal in the first band;
a second amplifier that is connected to the third filter and that amplifies a radio-frequency signal in the third band; and
a switch that switches between a connection between the first filter and the first amplifier and a connection between the second filter and the first amplifier,
wherein, under a condition that a transmission of the radio-frequency signal in the first band is not a V2X communication and the radio-frequency signal in the first band or the second band and the radio-frequency signal in the third band are simultaneously transmitted, the first filter is connected to the first amplifier via the switch,
wherein, under a condition the transmission of the radio-frequency signal in the first band is the V2X communication, the second filter is connected to the first amplifier via the switch.

17. The radio-frequency circuit according to claim 16, wherein, under a condition that the transmission of the radio-frequency signal in the first band is not the V2X communication and the radio-frequency signal in the second band is transmitted alone, the first filter is connected to the first amplifier via the switch, and
wherein, under a condition that the transmission of the radio-frequency signal in the first band is the V2X communication, the transmission application transmitting the radio-frequency signal in the third band is the V2X communication, and the radio-frequency signal in the first band and the radio-frequency signal in the third band are simultaneously transmitted, the second filter is connected to the first amplifier via the switch.

18. The radio-frequency circuit according to claim 16, wherein the first band is a frequency band capable of being used in transmission,
wherein the first amplifier is a power amplifier,
wherein, under a condition the transmission of the radio-frequency signal in the first band is not the V2X communication, the first amplifier operates in an average power tracking method, and
wherein, under a condition the transmission of the radio-frequency signal in the first band is the V2X communication, the first amplifier operates in an envelope tracking method.

19. The radio-frequency circuit according to claim 16, wherein the third band is n3 for 5th-generation-New Radio or Band3 for Long Term Evolution.

20. A communication apparatus comprising:
a signal processing circuit that processes a radio-frequency signal; and
the radio-frequency circuit according to claim 16, which transmits the radio-frequency signal between the signal processing circuit and an antenna.

* * * * *